G. A. BENTLEY.
SEED POTATO CUTTING MACHINE.
APPLICATION FILED AUG. 14, 1917.

1,383,970.

Patented July 5, 1921.
2 SHEETS—SHEET 1.

Inventor
G. A. Bentley.

Witnesses

By
Attorney

G. A. BENTLEY.
SEED POTATO CUTTING MACHINE.
APPLICATION FILED AUG. 14, 1917.
1,383,970.
Patented July 5, 1921.
2 SHEETS—SHEET 2.
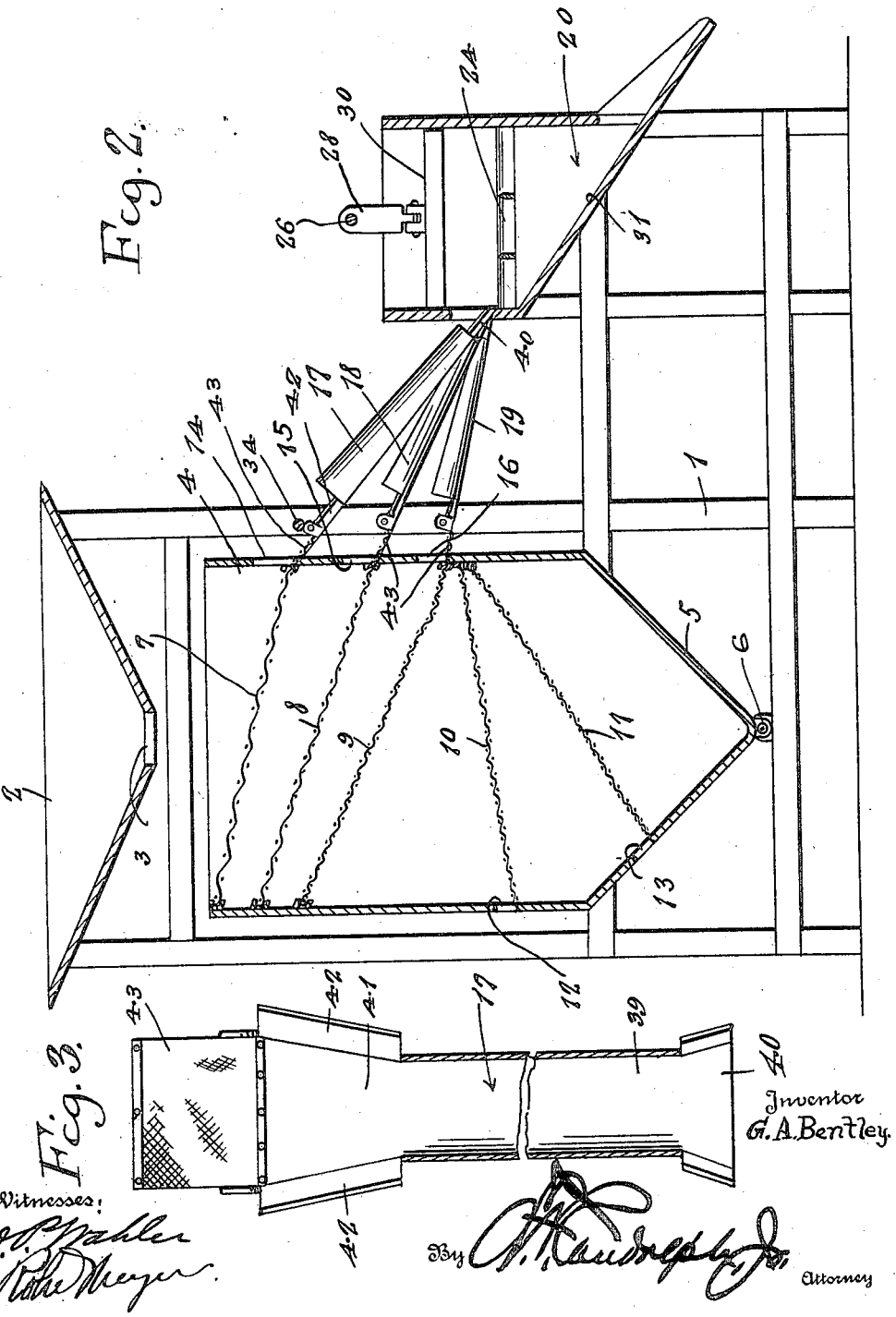

UNITED STATES PATENT OFFICE.

GEORGE A. BENTLEY, OF MARATHON, IOWA.

SEED-POTATO-CUTTING MACHINE.

1,383,970.  Specification of Letters Patent.  Patented July 5, 1921.

Application filed August 14, 1917. Serial No. 186,130.

*To all whom it may concern:*

Be it known that I, GEORGE A. BENTLEY, a citizen of the United States, residing at Marathon, in the county of Buena Vista and State of Iowa, have invented certain new and useful Improvements in Seed-Potato-Cutting Machines; and I do hereby declare the following to be a full, clear, and exact description of the invention, such as will enable others skilled in the art to which it appertains to make and use the same.

This invention relates to a device particularly designed for cutting seed potatoes into plantable pieces or particles and the primary object of the invention is to provide a machine which will expedite the cutting of seed potatoes and cut all of the potatoes both large and small into pieces of approximately the same size, so that they can be easily planted by the automatic potato planter now upon the market.

More specifically, the object of this invention is to provide a potato sorting device including a plurality of screens which are carried by a vibratory casing, and to provide a cutting box having a plurality of knives arranged therein, to which the potatoes are delivered, and to provide spouts for guiding the potatoes from the various sieves or riddles to compartments of the cutting box according to their size, wherein the potatoes are cut by being forced downwardly upon the cutting knives.

A further object of the invention is to provide a cutting box structure for a device as specified, which is divided into compartments for receiving the large potatoes, medium size and small potatoes and to mount a plunger in each of the compartments which is operated by the rotation of a crank shaft for forcing a potato forwardly upon the knives, which will cut all of the potatoes regardless of their size into pieces of substantially the same size, which pieces will fall upon a platform and be guided into a basket or suitable retaining receptacle.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which—

Fig. 2 is a vertical section through the machine,

Fig. 3 is a detail section through one of the troughs which guide the potatoes from the riddles or sieves to the cutting box.

Figure 1:
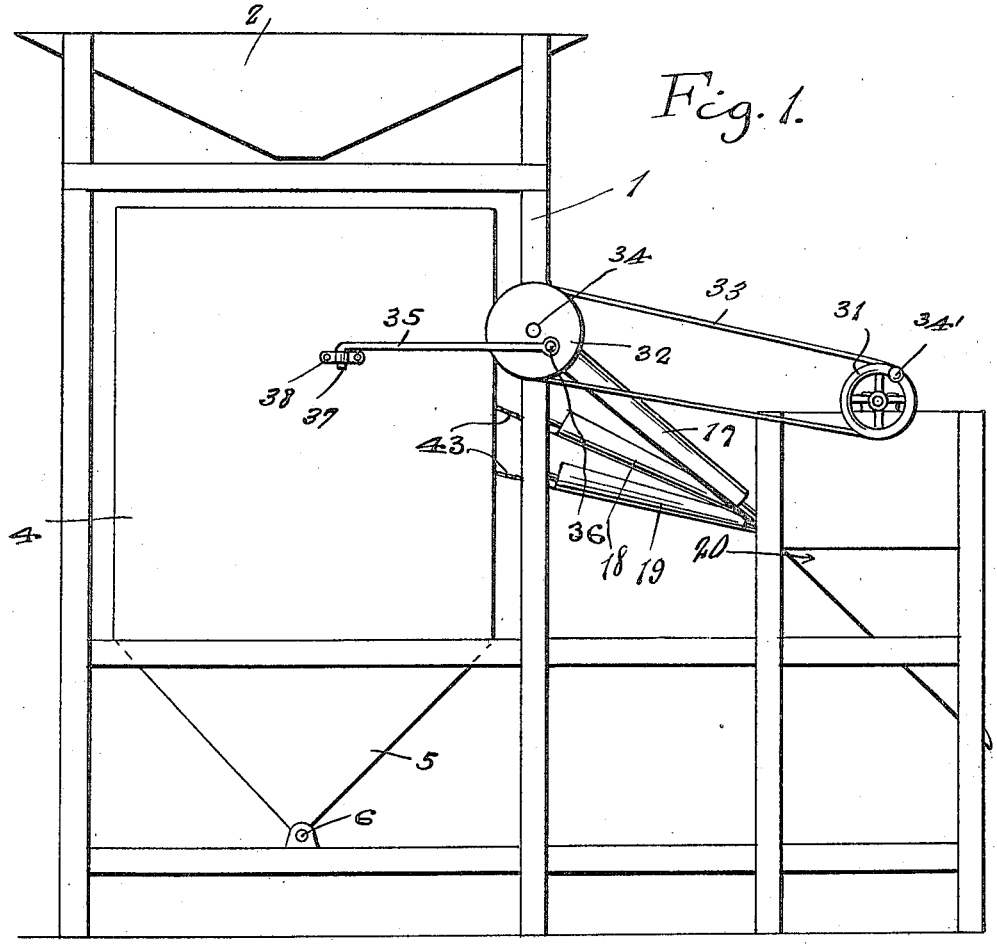
Figure 1 is a side elevation of the improved seed potato cutting machine.

Referring more particularly to the drawings 1 designates the supporting structure of the device, as an entirety, which has a hopper 2 attached to the upper end of the same, into which hopper the potatoes are poured from a sack, basket or the like. The potatoes pass through the opening 3 formed in the lower end of the hopper 2 into a casing or housing 4. The casing or housing 4 has its bottom pointed, as shown at 5, and pivotally connected as shown at 6 to the supporting structure 1.

Figures 4, 5:
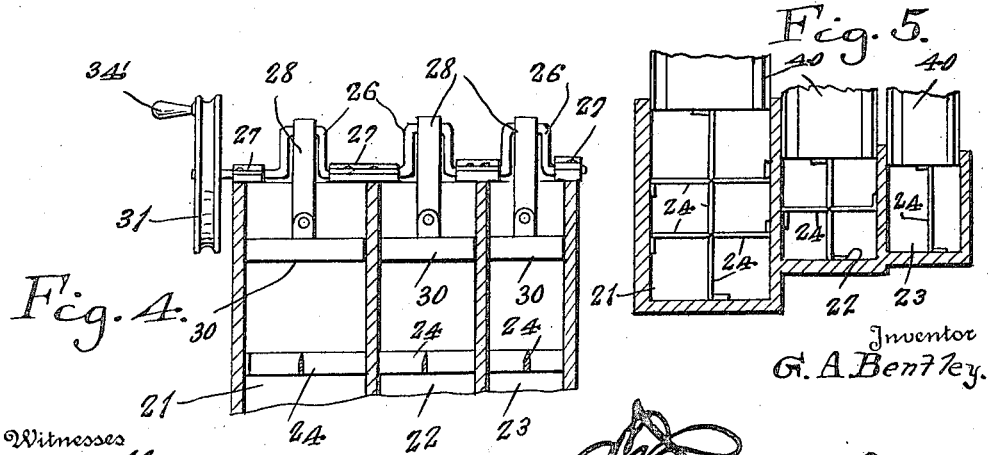
Fig. 4 is a detail vertical section through the cutting box.
Fig. 5 is a fragmentary horizontal section through the cutting box.

The potatoes fall from the hopper 2 upon a screen or riddle 7 which extends across the upper end of the housing or casing 4 and which is of mesh sufficient to prevent the large potatoes passing therethrough, and to allow the medium and small potatoes to fall therethrough upon riddles 8 and 9 respectively which are positioned one beneath the other. The riddle 8 has mesh sufficient to prevent the medium size potatoes from falling therethrough but to allow the small potatoes to fall therethrough upon the riddle 9. A pair of riddles or screens 10 and 11 are carried by the housing and positioned one beneath the other, and beneath the screen or riddle 9. These riddles are provided for sorting the very small potatoes from dirt or the like and they incline in the opposite direction to the inclination of the riddles or screens 7, 8 and 9 communicating with openings 12 and 13 respectively formed in the side of the housing, out of which openings the very small potatoes and dirt fall into any suitable type of receptacle. The casing 4 is provided with openings 14, 15 and 16 formed in its sides at the delivery ends of the screens or riddles 7, 8 and 9 and the potatoes which are prevented from passing through the screens fall through the openings upon troughs 17, 18 and 19 which guide the potatoes from their respective screens to the cutting box structure 20. The cutting box structure 20 is divided into compartments 21, 22 and 23 which receive the potatoes from the screens 7, 8 and 9 respectively. The compartments 21, 22 and 23 have knives 24 positioned therein, the cutting edges of which are positioned upwardly. The compartment 21 has three knives 24 positioned therein, one of which extends longitudinally through the center of the compartment and the other two which extend transversely to the longitudinally extending knife as clearly shown in Fig. 5 of the drawings so that the potatoes delivered to this compartment will be cut in six pieces. The compartment 22 has only two knives positioned therein so that the potatoes delivered to that compartment will be cut in four pieces, while only one knife is positioned in the compartment 23 to cut the potatoes delivered to this compartment in two pieces, thereby all of the potatoes will be cut into pieces of substantially the same size, for planting.

A crank shaft 26 is rotatably supported by suitable bearings 27 above the various compartments 21, 22, and 23 and it has connecting bars 28 connected to the crank wrist thereof. The connecting bars 28 are connected to reciprocable heads 30 which are slidably mounted in the compartments 21, 22 and 23 for pressing potatoes delivered to this compartment on the knives 24 at which time the potatoes will be cut into pieces and fall through between the knives upon an inclined platform 31 which will guide the potatoes to a suitable retaining receptacle. A grooved pulley 31 is mounted upon the crank shaft 26 and is connected to a pulley 32 through the medium of a belt 33. The pulley 31 has a handle 34' carried thereby by means of which this pulley and the crank shaft may be manually rotated. If it is desired a double face pulley may be provided, and the device may be operated from any suitable type of prime mover, without departing from the spirit of this invention.

The pulley 32 is mounted upon a shaft 34 which is carried by the supporting structure 1 and it has a rod 35 eccentrically connected thereto as shown at 36. The rod 35 has its free end angled as shown at 37 and seated in a socket 38 that is carried by the receptacle 4 so that upon rotation of the pulley 32, the receptacle 4 will be rocked upon its pivot 6, for vibrating the screens 7, 8, 9, 10 and 11 to insure the passage of the potatoes over the screens or through them.

The trough structure 17 comprises tubes 39 which have their ends 40 flared and flattened for delivering the potatoes to the various compartments 21, 22 and 23 and they have flattened flared receiving portions 41 along the side edges of which are mounted upstanding flanges 42. The flat receiving portions 41 have pieces of fabric or other suitable material 43 connected thereto, and to the casing or receptacle 4 at the lower edges of the openings 14, 15 and 16 respectively so as to form a connection between the casing and the troughs at all times during the vibratory movement of the receptacle 4.

Summing up, generically, the operation of the improved seed potato cutter is as follows: The potatoes are dumped in the hopper 2 and they fall through the outlet opening 3 of this hopper upon the screen 7, which separates the large potatoes from the remaining potatoes, delivering the large potatoes through the openings 14 upon the uppermost trough 17 and into the compartment 21. The medium size potatoes are delivered to the compartment 22, by the screen 8 and trough 18, while the small potatoes are delivered to the compartment 23 by the screen 9 and trough 19 while the very small potatoes fall through the screen 9 and are delivered by the screens 10 and 11 out of the housing 4 through the openings 12 and 13. The vibration of the housing or receptacle 4 by the rotation of the crank shaft and pulley 31, will increase the efficiency of the operation of the sieves or screens. The compartments 21, 22 and 23 are just large enough to hold a potato, so that only one potato can be cut at a time in each of the compartments. The rotation of the crank shaft 26 will move the heads 30 downwardly, forcing the potatoes upon the knives 24, which will cut the potatoes into the respective number of pieces, which pieces will be forced between the knives upon the inclined platform 31 and into a suitable receptacle from which they may be planted.

From the foregoing description taken in connection with the accompanying drawings the advantages of construction and of the method of operation of the improved seed potato cutting machine will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

It should be noted however that those members of the grading screens which are located relatively close to the axis of movement of the casing, which is preferably pivoted at its lower end so that the oscillatory movement is at the upper end, are screens of the smaller mesh and have a relatively short path of movement, so that the objects traversing the surface thereof are agitated to a less extent, are disposed at a greater or sharper inclination than those screens of larger mesh which are located more distant from the axis of movement and therefore have a longer range of movement in the oscillation of the casing, whereas the chutes which communicate respectively with the outlets to which the grading screens lead and which convey the product respectively to the graded cutters or the elements of the cutting mechanism, are graded in inclination reversely to that order indicated with reference to the grading screens, in that the chutes which receive the potatoes from the screens of larger mesh and which are therefore more remote from the axis of movement of the casing are disposed at a greater or sharper inclination than those chutes which communicate with the openings to which the screens of smaller mesh lead. The object in this arrangement with reference to the chute is to insure the impartation to the potatoes of impulses sufficient to properly position them in the compartments of the cutting mechanism, it being obvious that the larger, or as a rule longer, potatoes which are to be deposited in the larger cutting compartments must receive a greater impulse in order that they may be arranged in the compartments so as to insure the effective division thereof for planting purposes. Obviously the described and preferred arrangement of the superposed grading screens is designed to insure a substantially uniform or standard agitation of the objects carried respectively thereby, and at the same time give the larger objects which are retained upon the uppermost screen an opportunity for separation sufficiently to permit the potatoes of smaller sizes to pass through the screen to the lower members of the screening or separating mechanism.

What is claimed is:—

1. A device for sorting and directing selected potatoes to graded cutters, having an oscillatory casing pivotally mounted at its lower end and having lateral outlets, stationary chutes having flexible conveyer elements between their inlet ends and said outlets, and grading screens of graduated mesh arranged at graduated inclination in superposed relations in the casing and respectively in communication with said outlets.

2. A device for sorting and directing selected potatoes to graded cutters, having an oscillatory casing pivotally mounted at its lower end and having lateral outlets, stationary chutes having flexible conveyer elements between their inlet ends and said outlets, and grading screens of graduated mesh arranged at graduted inclinations in superposed relation in the casing and respectively in communication with said outlets, the screens of smaller mesh which are arranged near the axis of movement being disposed at more abrupt inclinations.

3. A device for sorting and directing selected potatoes to graded cutters, having an oscillatory casing pivotally mounted at its lower end and having lateral outlets, stationary chutes having flexible conveyer elements between their inlet ends and said outlets, and grading screens of graduated mesh arranged at graduated inclinations in superposed relation in the casing and respectively in communication with said outlets, the screens of smaller mesh which are arranged near the axis of movement being disposed at more abrupt inclinations, and the chutes being arranged at graduated inclinations.

4. A device for sorting and directing selected potatoes to graded cutters, having an oscillatory casing pivotally mounted at its lower end and having lateral outlets, stationary chutes having flexible conveyer elements between their inlet ends and said outlets, and grading screens of graduated mesh arranged at graduated inclinations in superposed relation in the casing and respectively in communication with said outlets, the screens of smaller mesh which are arranged near the axis of movement being disposed at more abrupt inclinations, and the chutes being arranged at graduated inclinations, with those which receive the potatoes from the screens of larger mesh being at a greater inclination than those receiving from the screens of smaller mesh.

In testimony whereof I affix my signature in presence of two witnesses.

GEORGE A. BENTLEY.

Witnesses:
N. O. NELSON,
A. BENTLEY.